United States Patent
Nambu

(10) Patent No.: US 7,823,604 B2
(45) Date of Patent: Nov. 2, 2010

(54) EXHAUST APPARATUS PRESSURE CONTROL SYSTEM

(75) Inventor: Masahiro Nambu, Saitama (JP)

(73) Assignee: Advanced Energy Industries, Inc., Fort Collins, CO (US)

( * ) Notice: Subject to any disclaimer, the term of this patent is extended or adjusted under 35 U.S.C. 154(b) by 250 days.

(21) Appl. No.: 11/994,696

(22) PCT Filed: Jun. 27, 2006

(86) PCT No.: PCT/US2006/025159

§ 371 (c)(1),
(2), (4) Date: Jun. 12, 2008

(87) PCT Pub. No.: WO2007/005461

PCT Pub. Date: Jan. 11, 2007

(65) Prior Publication Data

US 2008/0264494 A1 Oct. 30, 2008

(30) Foreign Application Priority Data

Jul. 4, 2005 (JP) .............................. 2005-195315

(51) Int. Cl.
*G05D 16/20* (2006.01)
*F16K 31/12* (2006.01)
(52) U.S. Cl. ............... 137/625.69; 137/81.1; 137/240; 137/487.5; 137/596.16
(58) Field of Classification Search ............. 137/487.5, 137/625.69, 625.67, 81.1, 596.16, 240; 156/345.29; 118/715

See application file for complete search history.

(56) References Cited

U.S. PATENT DOCUMENTS

| | | | | |
|---|---|---|---|---|
| 5,000,221 | A | * | 3/1991 | Palmer ................... 137/505.38 |
| 6,073,644 | A | * | 6/2000 | Friedmann et al. ....... 137/487.5 |
| 6,237,635 | B1 | | 5/2001 | Nambu |
| 2004/0007186 | A1 | | 1/2004 | Saito |

FOREIGN PATENT DOCUMENTS

| JP | 08055769 | 2/1996 |
|---|---|---|
| JP | 2001-005536 | 1/2001 |

OTHER PUBLICATIONS

International Searching Authority, International Preliminary Report on Patentability, May 10, 2007.

(Continued)

*Primary Examiner*—Kevin L Lee
(74) *Attorney, Agent, or Firm*—Neugeboren O'Dowd PC; Sean R. O'Dowd

(57) ABSTRACT

A pressure control system is disclosed. The control system in one embodiment includes a main body comprising a pilot chamber wherein an intake port and a discharge port are formed, and a spool comprising an upper slide and a lower slide. The spool in this embodiment is attached by a spring to the upper part of the main body. The exhaust apparatus pressure control system includes an absolute pressure sensor for detecting the pressure in the intake port and a differential pressure sensor for detecting the difference between the pressure in the intake port and atmospheric pressure; a control valve for supplying a pressure regulating gas to the pilot chamber; and a control circuit for sending switching signals to the absolute pressure sensor and the differential pressure sensor, and driving the control valve based on the output from the absolute pressure sensor or differential pressure sensor.

4 Claims, 9 Drawing Sheets

OTHER PUBLICATIONS

International Searching Authority, International Search Report, May 10, 2007.

Japanese Patent Office, English Translation of Patent Abstract for JP08055769A, Feb. 27, 1996.

* cited by examiner

EXHAUST APPARATUS PRESSURE CONTROL SYSTEM

RELATED APPLICATIONS

The present application claims priority under 35 USC §§119 and 365 to commonly owned and assigned Application No. PCT/US2006/025159, filed Jun. 27, 2006 entitled Exhaust Apparatus Pressure Control System, which claims priority to Japanese Application JP2005-195315 filed Jul. 4, 2005, both of which are incorporated herein by reference.

FIELD OF THE INVENTION

This invention relates generally to the technical field of pressure control systems for controlling the exhaust pressure of an exhaust apparatus, and more particularly to absolute pressure control systems that use an atmospheric pressure sensor.

BACKGROUND OF THE INVENTION

Oxidizing, diffusing, and CVD apparatuses and the like are configured such that various gasses are supplied to and caused to react in a chamber, after which the post-reaction gases are exhausted by an exhaust apparatus.

In such cases, when the internal pressure in the chamber changes very rapidly, the reaction in the chamber interior is adversely affected. For that reason, pressure control systems are provided in exhaust apparatuses, and control is effected so that the pressure of the gases exhausted is always constant, irrespective of changes in the flow rate of the gases being exhausted or of pressure changes downstream from the exhaust apparatus.

Commonly owned and unexamined Japanese patent application No. 2001-5536, incorporated herein by reference, discloses one such pressure control system, and FIG. 9 is a configuration diagram for that pressure control system. As diagrammed in FIG. 9, a pressure control system 100 has a main body 20 wherein a gas intake port 22 and discharge port 24 are formed, and a spool 40 taken in by the sliding surfaces of the main body 20, and the chamber exhaust port (not shown) of an oxidizing, diffusing, or CVD apparatus or the like is connected to the intake port 22. Also, the spool 40 is attached by a spring to the upper part of the main body.

In the upper part of the main body 20, a pilot chamber 30 is provided. The pilot chamber 30 is connected to the outside through a bleed port 34. To the outside of the main body 20, moreover, a differential pressure sensor S for measuring the pressure at the intake port 22 and a control circuit C for driving a control valve V based on the output from the differential pressure sensor S are attached. A high pressure port R of the differential pressure sensor S is connected to atmospheric pressure, a low pressure port thereof is connected to the pressure Pi at the intake port 22, and the control valve V is driven based on the differential between those two pressures. To the pilot chamber 30, a regulating gas is supplied, through a pilot passageway, from the control valve V, and the internal pressure Pp in the pilot chamber 30 is regulated so that the gas pressure Pi at the intake port 22 is constant.

As described in detail in unexamined Japanese patent application No. 2001-5536, in this pressure control system 100, in order to make the gas pressure Pi at the intake port 22 constant, with the elastic force of the spring held constant, the volume of regulating gas supplied from the control valve V need only be regulated so that the internal pressure Pp in the pilot chamber 30 attains a prescribed pressure.

However, because this pressure control system 100 is a differential pressure control system that references atmospheric pressure, when the atmospheric pressure fluctuates due to changes in weather conditions or differences in elevation or the like, the exhaust pressure will also fluctuate, and that affects film thicknesses in semiconductor manufacturing processes, which is a problem.

The problem described above can be resolved because, if the exhaust pressure is controlled using an absolute pressure sensor, atmospheric pressure fluctuations will have no effect. However, the exhausting capability of factory exhaust ducts is only something like −5 to −10 hPa relative to the atmospheric pressure, wherefore, when the atmospheric pressure rises 10 hPa, it will not be possible to control to a vacuum. When, for example, the atmospheric pressure is 1000 hPa, if the pressure control setting is made 998 hPa, the pressure in the factory exhaust duct will be 990 to 995 hPa, but, when the atmospheric pressure rises to 1010 hPa, the pressure in the factory exhaust duct will become 1000 to 1005 hPa, which will rise above the pressure control setting, whereupon it will no longer be possible to control to a vacuum. Thereupon, absolute pressure control using a scheme wherewith an ejector (vacuum generator) is placed downstream from the pressure control system and constant pressure is always maintained is generally employed.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as an exhaust apparatus pressure control system. The pressure control system in this embodiment includes a main body comprising a pilot chamber wherein an intake port and a discharge port are formed, and a spool comprising an upper slide and a lower slide. The spool in this embodiment is attached by a spring to the upper part of the main body, and, by the upper slide and the lower slide, is held so that it can slide in the axial direction over a sliding surface connecting the intake port and the discharge port. The exhaust apparatus pressure control system includes an absolute pressure sensor for detecting the pressure in the intake port and a differential pressure sensor for detecting the difference between the pressure in the intake port and atmospheric pressure; a control valve for supplying a pressure regulating gas to the pilot chamber; and a control circuit for sending switching signals to the absolute pressure sensor and the differential pressure sensor, and driving the control valve based on the output from the absolute pressure sensor or differential pressure sensor.

BRIEF DESCRIPTION OF THE DRAWINGS

FIG. 7($b$) is a graph representing pressure control characteristics when a switchover has been made from the differential pressure sensor to the absolute pressure sensor.

DETAILED DESCRIPTION

Figure 1:
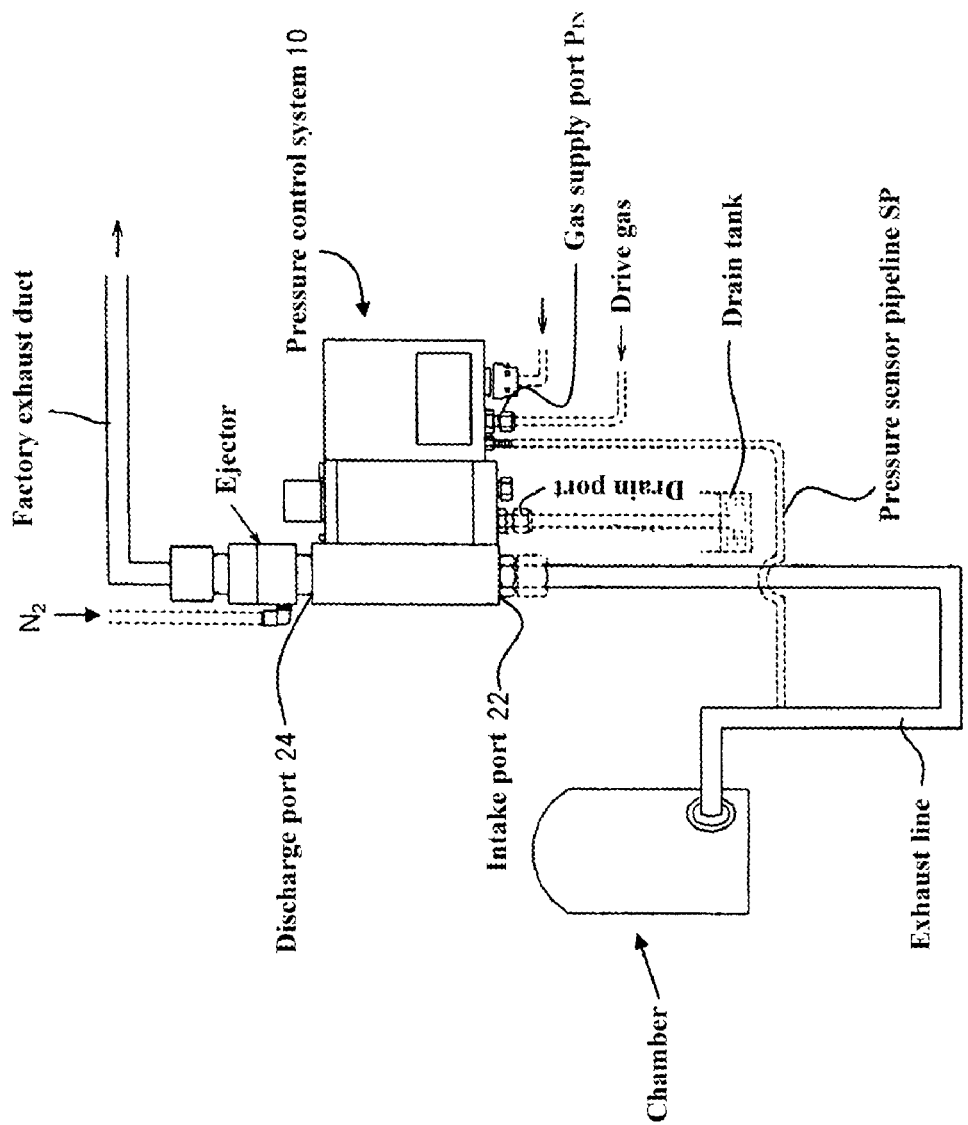
FIG. 1 is a diagram of one example of an installation of a pressure control system of an embodiment of the present invention.

When absolute pressure control is employed as described above, and a wafer is removed from the chamber of the semiconductor manufacturing apparatus, it is necessary to make the pressure inside the chamber the same as atmospheric pressure in order to prevent a large volume of air from flowing into the chamber due to the pressure differential and the production of particle contamination.

There are the following two methods for returning the interior of the chamber to atmospheric pressure. In the first of these methods, the ejector provided on the discharge side of the pressure control system is stopped so that the pressure obtained with that ejector has no effect on the upstream side of the ejector (in other words, the supply of nitrogen to the ejector is stopped). The pressure control system is left open. While measuring the chamber exhaust pressure with a differential pressure chamber provided between the chamber and the pressure control system, nitrogen is supplied to the interior of the chamber, and the pressure therein is restored to atmospheric pressure. The differential pressure sensor is connected by opening an on-off valve provided to prevent corrosion, but that valve is closed during film formation.

In the second method, the pressure control system is left closed, without stopping the ejector. An on-off valve and a pipeline connected to the factory exhaust duct are deployed between the pressure control system and the chamber. With the on-off valve open, nitrogen is supplied to the interior of the chamber, and the pressure therein is returned to atmospheric pressure, while measuring the exhaust pressure in the chamber by a differential pressure sensor deployed between the chamber and the pressure control system.

With the first method, however, it is necessary to have a valve for stopping the nitrogen supply to the ejector, and a circuit for sending a control signal to the valve.

With the second method, one must install a dedicated valve and pipeline for making the internal pressure in the chamber the same as the atmospheric pressure, and those must be matched with the exhaust pressure control system, whereupon there are problems in that the equipment becomes complex and costly.

In both the first and second methods, furthermore, an on-off valve is necessary to prevent corrosion in the differential pressure sensor, and it is necessary to automatically switch over the on-off valve when effecting absolute pressure control and when restoring the interior of the chamber to atmospheric pressure.

An object of embodiments of the present invention, in view of the problems described above, is to provide a simple pressure control system which exhibits outstanding responsiveness, stability, and precision in the face of changes in the flow rate of the control gas, and wherewith the inflow of particles when the chamber is opened in the atmosphere can be prevented.

Embodiments of the present invention resolves the problems noted above with an exemplary exhaust apparatus pressure control system comprising: a main body comprising a pilot chamber wherein an intake port and a discharge port are formed; and a spool comprising an upper slide and a lower slide, the spool whereof is attached by a spring to the upper part of the main body, and, by the upper slide and the lower slide, is held so that it can slide in the axial direction over a sliding surface connecting the intake port and the discharge port; that exhaust apparatus pressure control system having: an absolute pressure sensor for detecting the pressure in the intake port and a differential pressure sensor for detecting the difference between the pressure in the intake port and atmospheric pressure; a control valve for supplying a pressure regulating gas to the pilot chamber; and a control circuit for sending switching signals to the absolute pressure sensor and the differential pressure sensor, and driving the control valve based on the output from the absolute pressure sensor or the differential pressure sensor.

In embodiments of the pressure control system of the present invention, the configuration may be made such that a portion of the pressure regulating gas supplied to the pilot chamber is made a purge gas for protecting the absolute pressure sensor and the differential pressure sensor, and a purge gas flow path is provided which connects the pilot chamber, the absolute pressure sensor and the differential pressure sensor, and the intake port.

The configuration may also be made such that a channel is formed in the side surface of the spool, and gas for making the working of the spool smooth is supplied to that channel. The configuration may also be made so that gas for regulating the degree of opening of the valve unit is supplied to the interior of the spool on the intake port side.

The configuration may also be made such that a flow path is provided for supplying those gases to the channel and to the interior of the spool on the intake port side, such that a portion of the gases flowing through the flow path is made a purge gas for protecting the absolute pressure sensor and the differential pressure sensor, and such that a purge gas flow path is provided for connecting the flow path, the absolute pressure sensor and the differential pressure sensor, and the intake port.

With embodiments of the present invention, by providing an absolute pressure sensor for detecting the pressure at the intake port, and a differential pressure sensor for detecting the difference between the intake port pressure and atmospheric pressure, exhaust pressure control that is not affected by atmospheric pressure, and the prevention of the inflow of particles when the chamber is opened in the atmosphere, can be realized with one simple pressure control system. More specifically, when forming a film, by having the intake port pressure detected by the absolute pressure sensor fed back to a control circuit, the absolute pressure at the intake port can be controlled. Also, when a wafer is taken out of the chamber, by having the differential pressure between atmospheric pressure and the intake port pressure detected by the differential pressure sensor fed back to the control circuit, the intake port pressure can be made the same as the atmospheric pressure, and, as a consequence, the inflow of particles when the chamber is opened in the atmosphere can be prevented.

Accordingly, because feedback control can be done for two sensors with one control circuit, there is no longer any need to provide additional equipment or to stop the ejector in order to return the interior of the chamber to atmospheric pressure, whereupon the exhaust apparatus pressure control system is simplified.

Also, because the intake port gas pressure is detected with a pressure sensor and the output is fed back, outstanding responsiveness, stability, and precision are exhibited in the face of variation in the flow rate of gases at the intake port.

In addition, in one embodiment, a purge gas flow in a pressure sensor pipeline enables pressures can be measured without a corrosive gas directly contacting the two sensors.

Referring first to FIG. 1, it is a diagram of one example of an installation of a pressure control system 10 of an embodiment of the present invention. As diagrammed in FIG. 1, the exhaust line from the chamber in an oxidizing, diffusing, or CVD apparatus or the like is connected to the intake port 22 of the pressure control system 10, and, from a point midway along the exhaust line, the exhaust pressure is led by a pressure sensor pipeline SP to the pressure control system 10. To the discharge port 24 of the pressure control system 10 is connected an ejector, and the discharge port of the ejector is connected to the factory exhaust duct. To the ejector is supplied nitrogen gas for producing a suction force.

To the interior of the pressure control system 10, gases such as nitrogen are supplied from a gas supply port $P_{IN}$. The gases supplied from the gas supply port $P_{IN}$ are used as the pressure regulating gas, described subsequently, the purge gas for protecting the sensors, a gas for making the spool movement smooth, and a gas for regulating the degree of opening of a valve unit. A liquid discharge drain port is provided in the lower part of the main body for when water vapor or the like discharged from the chamber is cooled and liquid accumulates. This drain port is connected by a drain tube to a drain tank.

Figure 2:
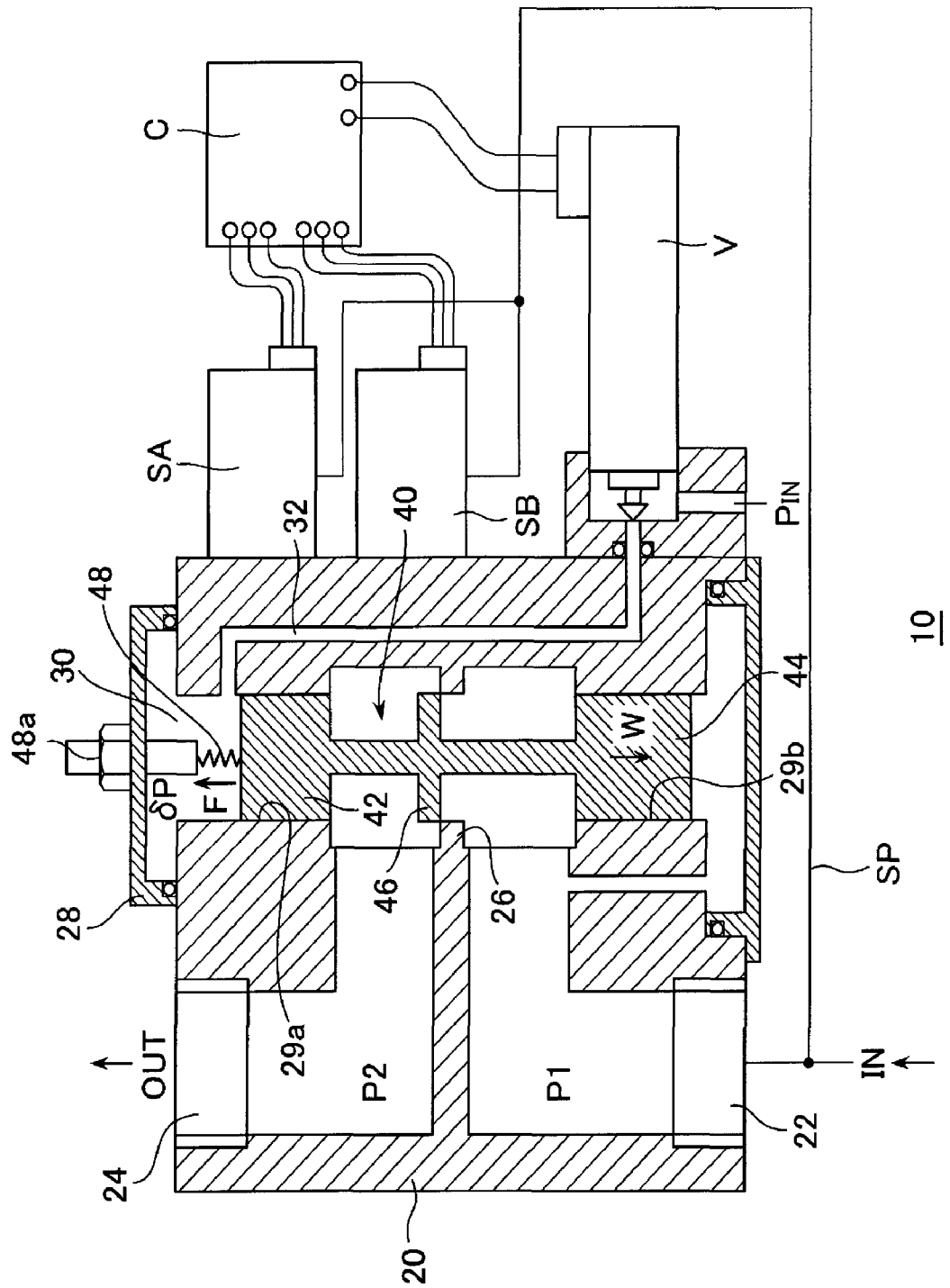
FIG. 2 is a diagram of the configuration of an exhaust apparatus pressure control system according to an embodiment of the present invention.

FIG. 2 is a diagram of the configuration of an exhaust apparatus pressure control system according to a first embodying mode of the present invention.

In the pressure control system 10, a gas intake port 22 and discharge port 24 are formed in the main body 20, a spool 40 is accepted by sliding surfaces 29a and 29b connecting the intake port 22 and the discharge port 24, and a pilot chamber 30 covered by a top cover 28 is provided at the upper part of the main unit (upper part of the spool).

To the exterior of the main body 20 are attached an absolute pressure sensor SA for detecting the pressure at the intake port 22 and a differential pressure sensor SB for detecting the difference between the atmospheric pressure and the pressure at the intake port 22, a control valve V for supplying a pressure regulating gas such as nitrogen to the pilot chamber 30 through a pilot passageway 32, and a control circuit C for switching between the absolute pressure sensor SA and the differential pressure sensor SB and driving the control valve V based on outputs from the absolute pressure sensor SA or differential pressure sensor SB.

The structure and basic operation of the pressure control system 10 are described in detail in unexamined Japanese patent application No. 2001-5536, wherefore only a simple description thereof is given here. The spool 40 is attached to the upper part of the main body by a spring 48, and, by an upper slide 42 and lower slide 44 formed respectively above and below the spool 40, is able to slide in the axial direction relative to the sliding surfaces 29a and 29b of the main body 20. Also, at the center in the axial dimension of the spool 40, a valve unit 46 is provided, corresponding to a valve seat 26 formed in the main body 20. A gap develops between the valve seat 26 and the valve unit 46 on the spool 40 which slides upward in the axial direction, whereupon the intake port 22 and discharge port 24 communicate. The elastic force F of the spring 48 holding the spool 40 can be adjusted by a spring adjustment screw 48a.

To the pilot chamber 30, pressure regulating gas is supplied from the control valve V through the pilot passageway 32, and maintained so that the interior pressure of the pilot chamber 30 becomes δP. In the pressure control system 10, if we designate the elastic force of the spring by F, the weight of the spool by W, the gas pressure at the intake port 22 by P1, the gas pressure at the discharge port 24 by P2, the diameter of the valve in the spool 40 by d, and the internal pressure in the pilot chamber 30 by δP, then, when the spool 40 is in a state of equilibrium, the formula:

$$P1 = 4/\pi d^2 \cdot (W-F) + \delta P$$

will be true. Accordingly, the pressure P1 of the gas passing through the intake port 22 will be unrelated to the gas pressure P2 at the discharge port 24, but will be determined by the elastic force F of the spring and the internal pressure δP in the pilot chamber 30. By regulating the volume of pressure regulating gas supplied from the control valve V so as to make δP constant, the degree of opening in the valve unit 46 will be controlled, and the gas pressure P1 at the intake port 22 will be maintained at a set value.

When the pressure P1 at the intake port 22 becomes higher than the set value, the lower slide 44 of the spool 40 will be pushed up, the spool 40 will rise in the axial direction, and the degree of opening in the valve unit 46 will become greater. As a consequence, more gas will flow out from the intake port 22 to the discharge port 24 side, and, as a result, the pressure P1 at the intake port 22 will return again to the set value.

As diagrammed in FIG. 2, in the pressure control system 10, the exhaust pressure from the chamber is led simultaneously to the two sensors SA and SB through the pressure sensor pipeline SP.

During normal control, that is, during film formation, the absolute pressure at the intake port is controlled by having the pressure P1 at the intake port 22 detected by the absolute pressure sensor SA fed back to the control circuit C. At such time, the differential pressure sensor SB measures the pressure differential between the atmospheric pressure and the intake port pressure P1, and is used for monitoring the internal pressure in the chamber so that it does not rise.

When the interior of the chamber is returned to atmospheric pressure in order to remove a wafer from the chamber, by the input of a sensor switching signal, feedback is applied with the output of the differential pressure sensor SB. Nitrogen is supplied to the interior of the chamber to return the internal pressure in the chamber to atmospheric pressure. By sending a signal for making the set pressure P1 the atmospheric pressure (that is, a signal for making the differential pressure between the intake port 22 pressure and the atmospheric pressure 0) to the control circuit C, the volume of pressure regulating gas supplied from the control valve V is regulated, and the pressure in the interior of the chamber is restored to atmospheric pressure. As a consequence, the inflow of particles when the chamber is opened in the atmosphere can be prevented.

Figure 3:
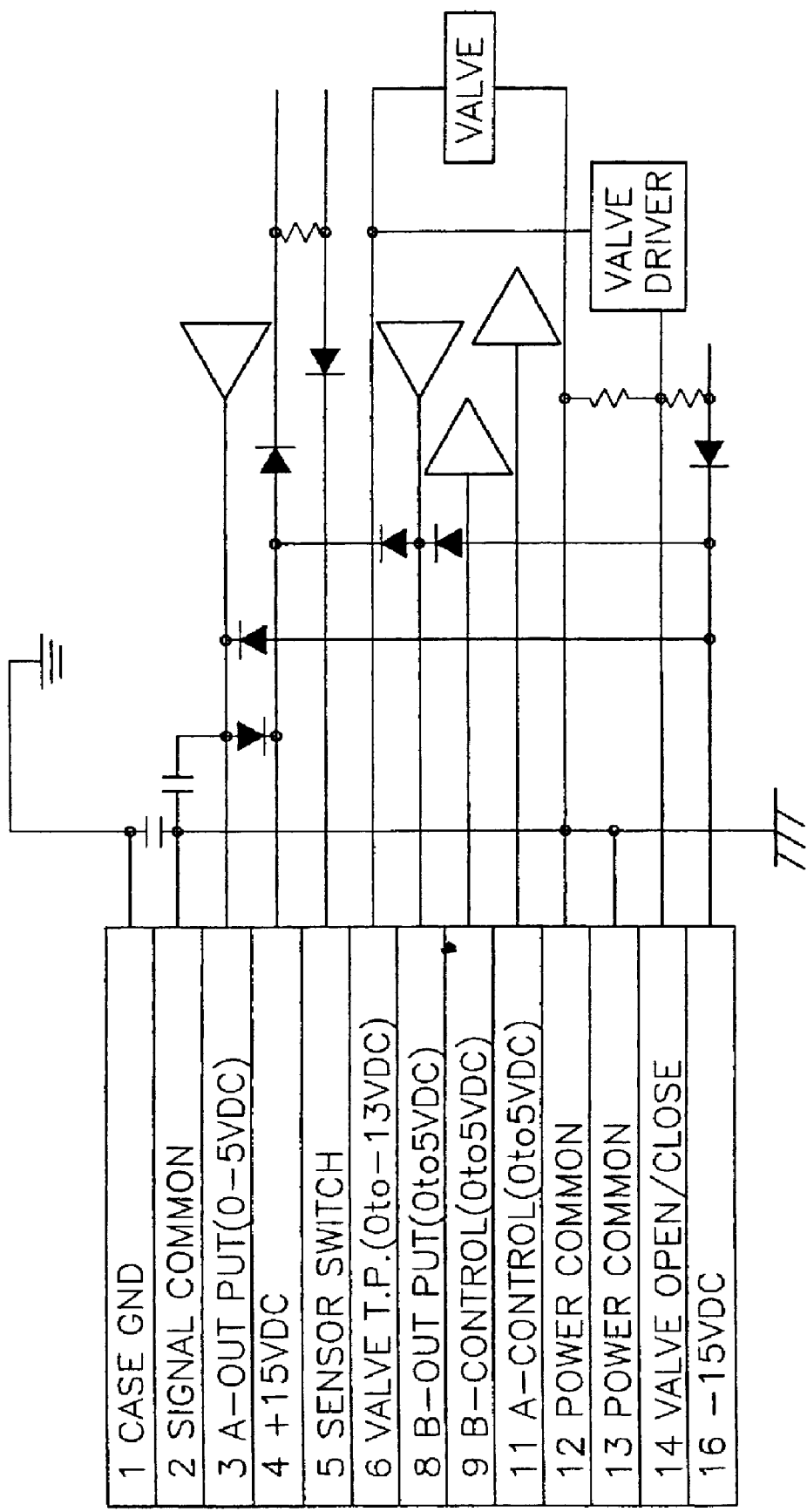
FIG. 3 is a diagram of one example of a control circuit.

In FIG. 3, one example of the control circuit C is diagrammed. The voltage outputs from the absolute pressure sensor SA and the differential pressure sensor SB always appear on pin number 3 and pin number 8, and provision is made so that the pressure at the intake port 22 can always be detected. During normal control (during film formation), absolute pressure control is effected, so the voltage output from the absolute pressure sensor SA will appear on pin number 3 and simultaneously be taken into a comparison control circuit in the control circuit. While comparing this with a setting signal sent through pin number 11 from the outside, the pressure regulating gas from the control valve V is regulated and the valve unit 46 is controlled. When the interior of the chamber is made the atmospheric pressure, by having a sensor switching signal input on pin number 5, the sensor taken into the comparison control circuit is switched from the absolute pressure sensor SA to the differential pressure sensor SB, the voltage from the differential pressure sensor SB corresponding to the atmospheric pressure is applied to pin number 9, and the control valve V is regulated. When returning again to normal control, by cutting off the sensor switching signal on pin number 5, the sensor taken into the comparison control circuit is switched from the differential pressure sensor SB to the absolute pressure sensor SA, and absolute pressure control is returned to. During normal control, if the output from the differential pressure sensor SB is always monitored with pin number 8, then, when the atmospheric pressure drops due to a typhoon or the like, for example, an alarm output is issued so that the pressure inside the chamber does not become higher than the atmospheric pressure, thus preventing a mishap before it can happen.

Figure 4:
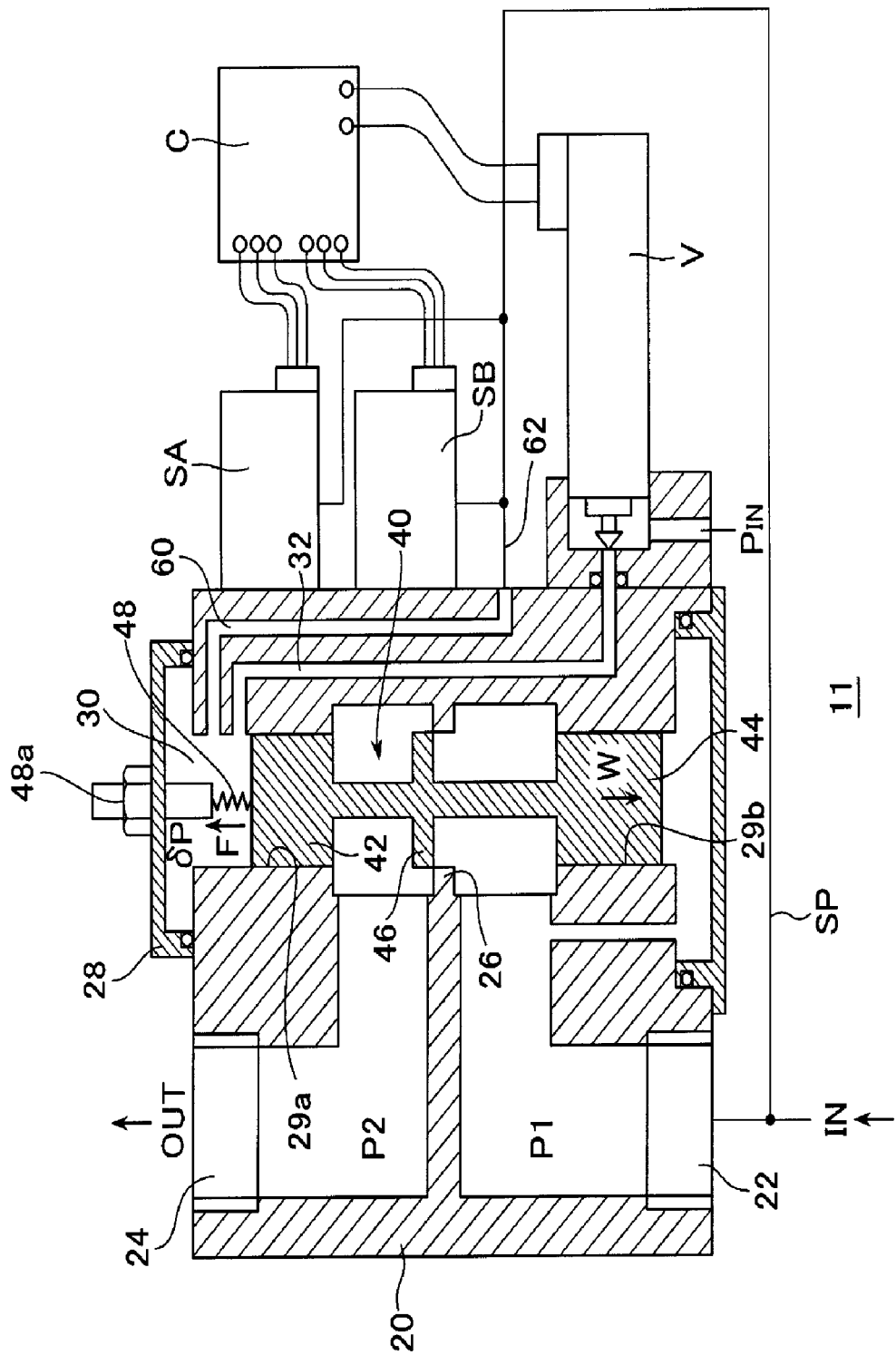
FIG. 4 is a diagram of the configuration of an exhaust apparatus pressure control system according to another embodiment of the present invention.

FIG. 4 is a diagram of the configuration of an exhaust apparatus pressure control system 11 according to a second embodying mode of the present invention.

The pressure control system 11 is configured so that, by making a portion of the pressure regulating gas supplied to the pilot chamber a purge gas for protecting the absolute pressure sensor SA and the differential pressure sensor SB, corrosive gas does not directly contact either the absolute pressure sensor SA or the differential pressure sensor SB.

In the pressure control system 11, a purge flow path 60 and a sensor flow path 62 extend, respectively, from the pilot chamber 30 and from the pressure sensor pipeline SP, and, by having the purge flow path 60 and the sensor flow path 62 mutually connect, a purge gas flow path is formed which connects the pilot chamber 30, the absolute pressure sensor SA and the differential pressure sensor SB, and the intake port 22.

The pressure δP in the pilot chamber is set higher than the pressure P1 at the intake port 22. Due to the pressure differential δP−P1 between the pressure δP in the pilot chamber and the pressure P1 at the intake port 22, a portion of the pressure regulating gas supplied to the pilot chamber 30 flows into the purge flow path 60 as purge gas, passes through the sensor flow path 62 and pressure sensor pipeline SP, and merges other gas at the intake port 22. Furthermore, by making the diameter of the pressure sensor pipeline SP larger than the diameter of the purge flow path 60, or constricting the purge flow path 60 or sensor flow path 62 (not shown), the pressure loss in the pressure sensor pipeline SP can be diminished, and, thereby, a pressure substantially equal to the pressure P1 at the intake port 22 will be detected by the absolute pressure sensor SA and differential pressure sensor SB.

Accordingly, in the pressure control system 11, the gas that passes through the intake port 22 will not pass through the pressure sensor pipeline SP. Therefore, even if the gas passing through the intake port 22 is a corrosive gas, it will not directly contact either the absolute pressure sensor SA or the differential pressure sensor SB, and the pressure thereof can be measured accurately.

Figure 5:
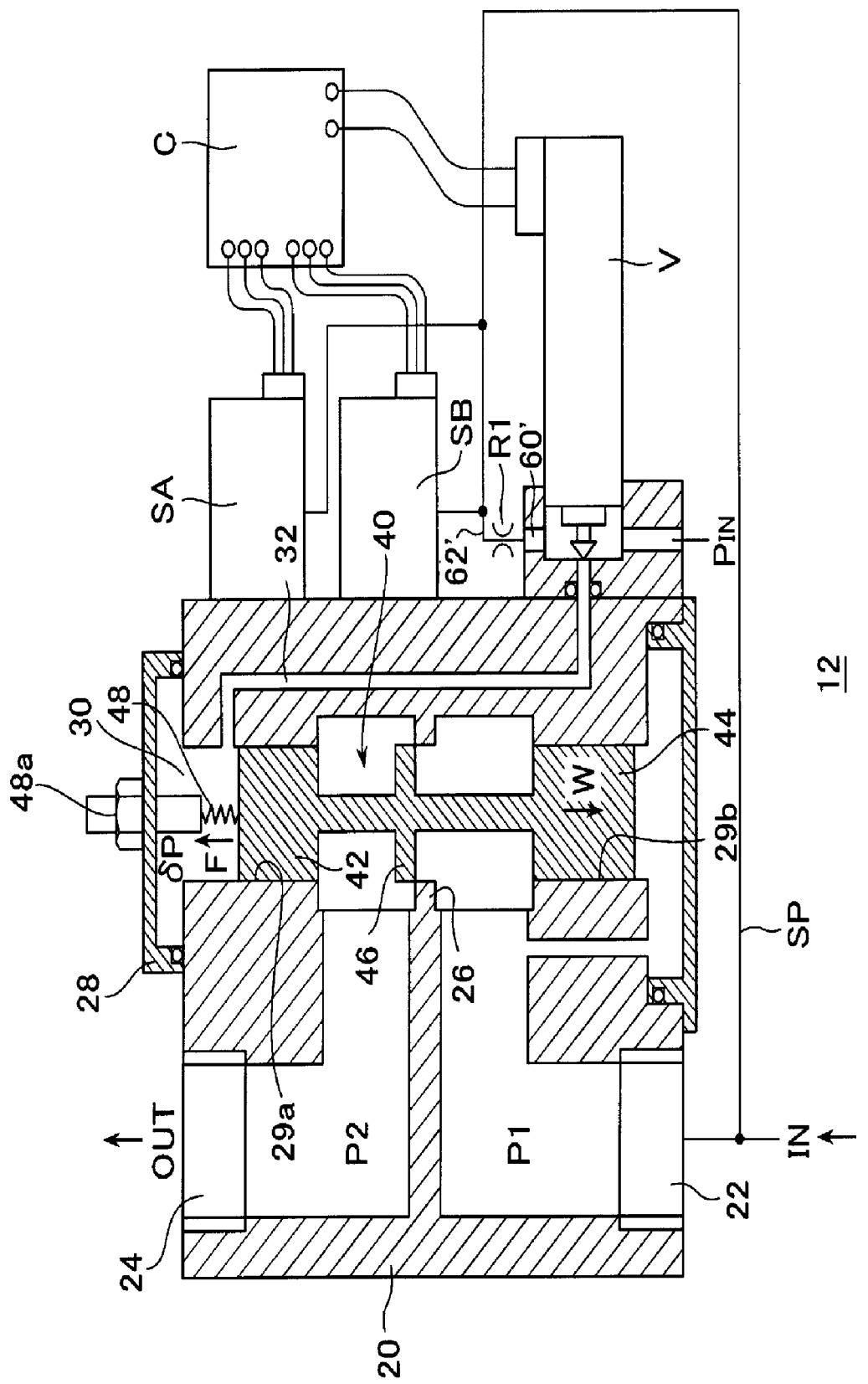
FIG. 5 is a diagram of the configuration of an exhaust apparatus pressure control system according to yet another embodiment of the present invention.

FIG. 5 is a diagram of the configuration of an exhaust apparatus pressure control system 12 according to a third embodying mode of the present invention.

The pressure control system 12, as described below, is configured so that a purge flow path 60' is connected to a gas supply port $P_{IN}$, so that the purge gas is supplied to the pressure sensor pipeline SP directly from the gas supply port $P_{IN}$. Accordingly, even when the control valve V is closed, and the pressure regulating gas is not supplied to the pilot chamber 30, purge gas can always flow to the pressure sensor pipeline SP.

In the pressure control system 12, the purge flow path 60' extends from the gas supply port $P_{IN}$, and the sensor flow path 62' extends from the pressure sensor pipeline SP, respectively, and the purge flow path 60' and sensor flow path 62' are mutually connected. Thereby, a purge gas flow path is formed which connects the gas supply port $P_{IN}$, the absolute pressure sensor SA and the differential pressure sensor SB, and the intake port 22.

A constriction R1 is deployed in the sensor flow path 62', and this constriction R1 is adjusted so that the pressures detected by the absolute pressure sensor SA and the differential pressure sensor SB become equal to the intake port pressure P1. The purge gas flows from the gas supply port $P_{IN}$ into the purge flow path 60', passes through the sensor flow path 62' and the pressure sensor pipeline SP, and merges with other gas at the intake port 22.

Accordingly, in the pressure control system 12 also, the gas (corrosive gas) that passes through the intake port 22 will not pass through the pressure sensor pipeline SP, and therefore the pressure can be measured without the corrosive gas directly contacting either the absolute pressure sensor SA or the differential pressure sensor SB.

Figure 6:
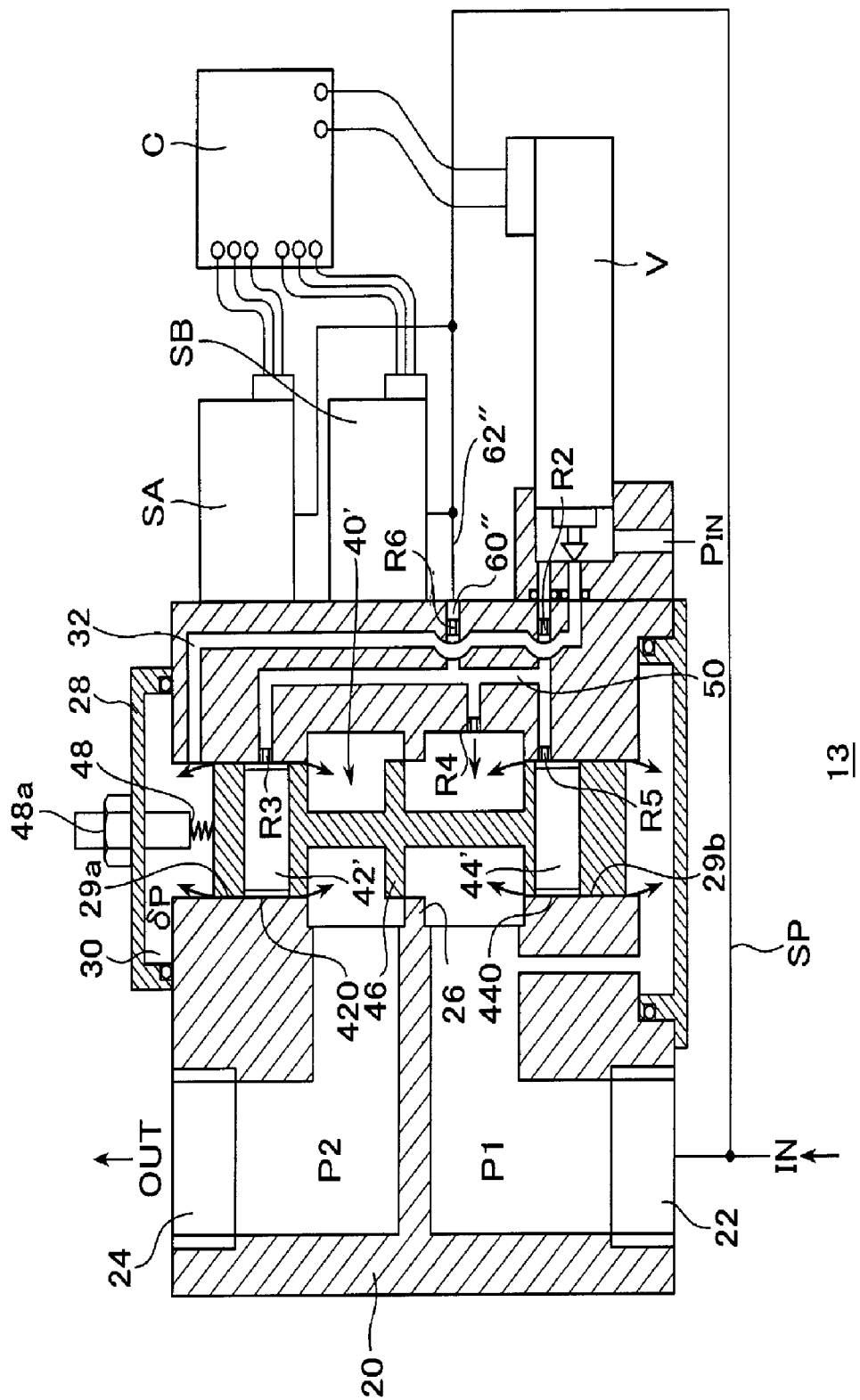
FIG. 6 is a diagram of the configuration of an exhaust apparatus pressure control system according to another embodiment of the present invention.

FIG. 6 is a diagram of the configuration of an exhaust apparatus pressure control system 13 according to a fourth embodying mode of the present invention.

In the pressure control system 13, channels 420 and 440 are formed, along the axis, in the side surfaces of the upper slide 42' and lower slide 44' of a spool 40'.

Gas is supplied from the gas supply port $P_{IN}$, via a pipeline 50 connected to the gas supply port, to the channels 420 and 440 and the interior of the spool on the intake port 22 side. Constrictions R2, R3, R4, and R5 are deployed in the pipeline 50, as diagrammed in FIG. 6, and the supply volume of the gas supplied from the gas supply port $P_{IN}$ is regulated by those constrictions.

In the pressure control system 13, gas is uniformly supplied between the channels 420 and 440 formed in the side surfaces of the slides 42' and 44' in the spool 40', thereby preventing the intrusion of dust particles and the like between the spool 40' and the sliding surfaces 29a and 29b, while also reducing the sliding friction between the spool 40' and the sliding surfaces 29a and 29b, making the movement of the spool smooth.

Moreover, when there is little gas passing through the intake port 22, and the prescribed degree of opening in the valve unit 46 is not obtained by the intake port pressure P1, the degree of opening in the valve unit 46 is regulated, and a constant amount of valve opening maintained, by having gas supplied to the interior of the spool 40' on the intake port 22 side.

In the pressure control system 13, furthermore, a purge flow path 60" extends from midway along the pipeline 50, and a sensor flow path 62" extends from the pressure sensor pipeline SP, respectively, and the purge flow path 60" and sensor flow path 62" are mutually connected. Thereby, a purge gas flow path is formed which connects the gas supply port $P_{IN}$, the absolute pressure sensor SA and the differential pressure sensor SB, and the intake port 22. Thereupon, by making a portion of the gas supplied to the pipeline 50 to be purge gas for protecting the absolute pressure sensor SA and differential pressure sensor SB, a configuration is effected wherewith corrosive gas does not directly contact either the absolute pressure sensor SA or the differential pressure sensor SB.

A constriction R6 is deployed in the sensor flow path 62", and this constriction R6 is adjusted so that the pressures detected by the absolute pressure sensor SA and the differential pressure sensor SB, and the intake port pressure P1, become equal. Purge gas flows from the gas supply port $P_{IN}$ through the pipeline 50 and into the purge flow path 60", passes through the sensor flow path 62" and pressure sensor pipeline SP, and merges with other gas at the intake port 22.

Accordingly, as with the pressure control system 12 of the third embodying mode, even when the control valve V is closed, and pressure regulating gas is not supplied to the pilot chamber 30, purge gas can be made to always flow to the pressure sensor pipeline SP, and pressures can be measured without corrosive gas directly contacting either the absolute pressure sensor SA or the differential pressure sensor SB.

Figure 7:
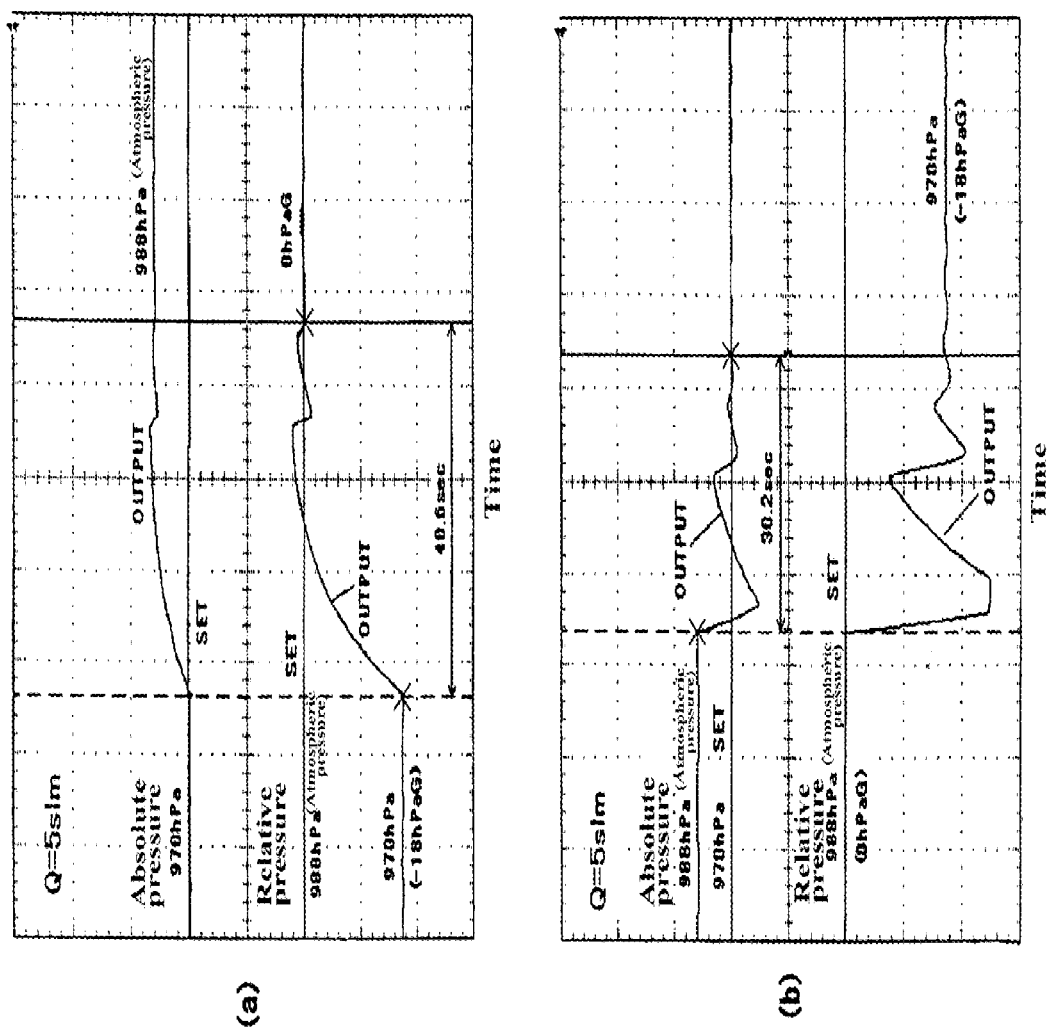
FIG. 7($a$) is a graph representing the pressure control characteristics of operation of the embodiment described with reference to FIG. 6.

FIG. 7(a) is a graph representing the pressure control characteristics when, in the pressure control system 13 in a fourth embodying mode, a switchover has been made from the absolute pressure sensor SA to the differential pressure sensor SB, while FIG. 7(b) is a graph representing the pressure control characteristics when a switchover has been made from the differential pressure sensor SB to the absolute pressure sensor SA. The set value for the intake port pressure P1 is 970 hPa, the atmospheric pressure is 988 hPa, and the control gas flow rate is 5 slm.

From FIG. 7(a) it is seen that, after switching from absolute pressure control to differential pressure control referencing the atmospheric pressure, the pressure at the intake port will quickly converge in the atmospheric pressure, without the pressure becoming unstable. From FIG. 7(b), moreover, it is seen that, even after switching from differential pressure control referencing the atmospheric pressure to absolute pressure control, the set value 970 hPa for the pressure P1 is quickly returned to.

Figure 8:
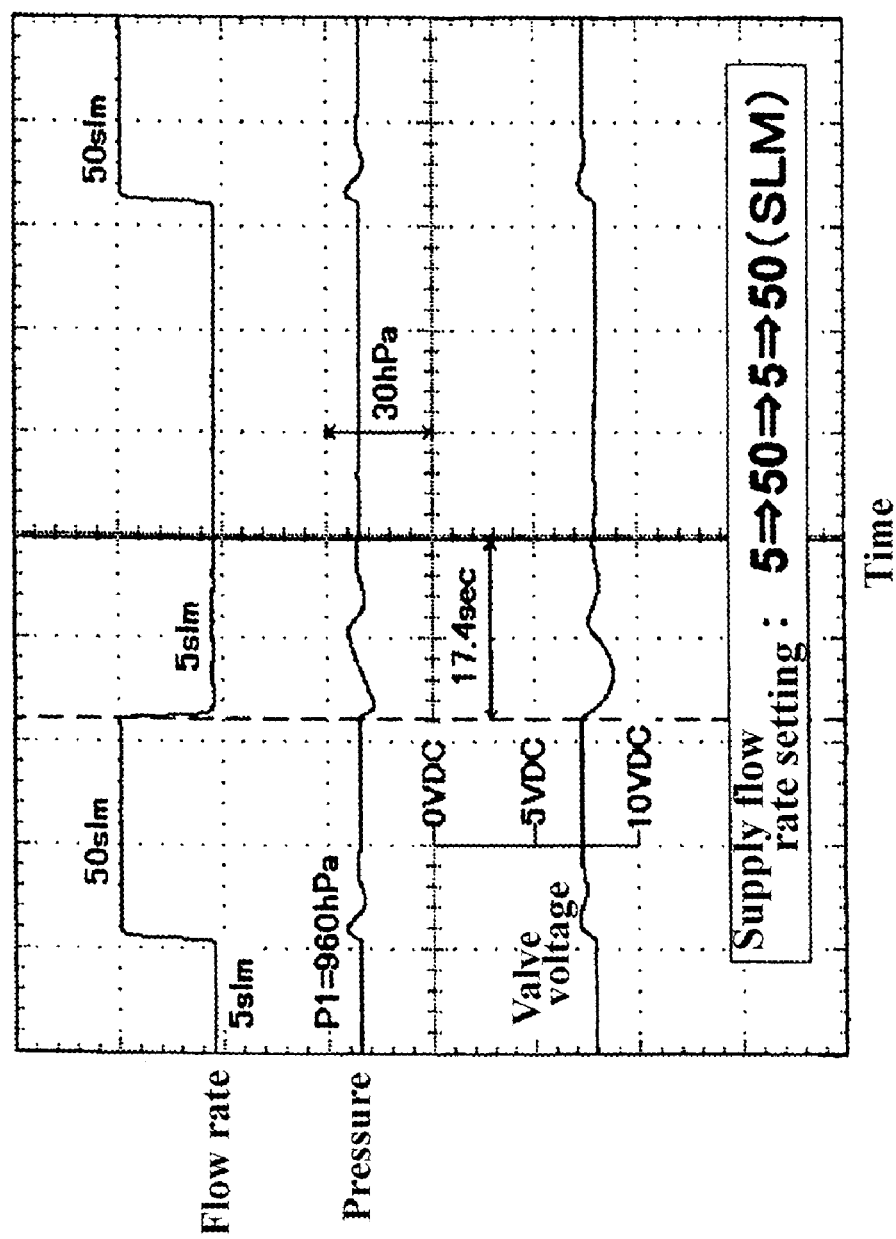
FIG. 8 is a graph representing the pressure stability characteristics in the face of flow rate changes in a control gas during absolute pressure control.
Figure 9:
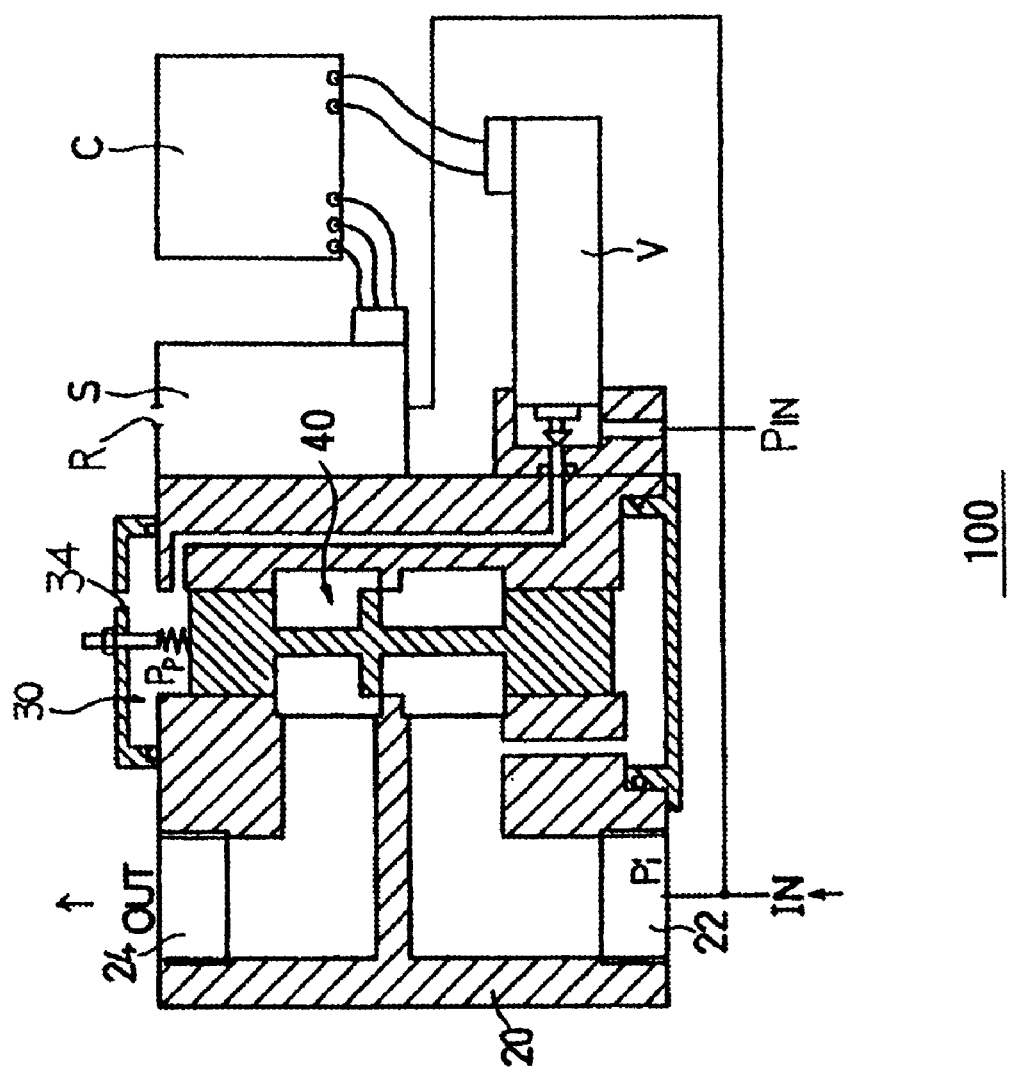
FIG. 9 is a configuration diagram for a conventional exhaust apparatus pressure control system.

FIG. 8 is a graph representing the pressure stability characteristics in the face of flow rate changes (5 slm→50 slm→5 slm→50 slm) in a control gas during normal control (during absolute pressure control). From FIG. 8 it is seen that, with the pressure control system 11, there is little fluctuation in pressure with changes in flow rate, the response time for flow rate changes is extremely short, and outstanding responsiveness, stability, and precision are exhibited in the face of control gas flow rate changes.

Based on the exhaust apparatus pressure control system of the present invention, as described in the foregoing, feedback is applied to a control circuit so that, during film formation, the output from the absolute pressure sensor becomes equal to the set pressure for the intake port, and, when a wafer is removed from the chamber, feedback is applied with the output from the differential pressure sensor, and the set pressure is made the atmospheric pressure, whereby, when the chamber is opened to the atmosphere, the inflow of particles can be prevented.

Accordingly, when the chamber is opened in the atmosphere, there is no longer any need, as conventionally, to stop the ejector, or install a dedicated valve or pipeline for making the internal pressure in the chamber equal to atmospheric pressure, and the pressure in the exhaust apparatus can be easily controlled.

Furthermore, by causing a purge gas to flow in the pressure sensor pipeline, corrosive gas will no longer directly contact the sensors, wherefore the necessity of providing an on-off valve or the like for preventing differential pressure sensor corrosion is eliminated.

EXPLANATION OF SYMBOLS 10, 11: Pressure control system
20: Main body
22: Intake port
24: Discharge port
29a, 29b: Sliding surfaces
30: Pilot chamber
40: Spool
42: Upper slide
44: Lower slide
46: Valve unit
48: Spring
50: Flow path (pipeline)
420, 440: Channels
SA: Absolute pressure sensor
SB: Differential pressure sensor
V: Control valve
C: Control circuit
$P_{IN}$: Gas supply port

What is claimed is:

1. An exhaust apparatus pressure control system comprising:
    a main body wherein an intake port and a discharge port are formed, the main body comprising a pilot chamber;
    a spool comprising an upper slide and a lower slide, the spool is attached by a spring to the upper part of the main body, and the spool is held by the upper slide and the lower slide so that it can slide in an axial direction over a sliding surface connecting the intake port and the discharge port; and
    an absolute pressure sensor for detecting the pressure in the intake port and a differential pressure sensor for detecting the difference between the pressure in the intake port and atmospheric pressure;
    a control valve for supplying a pressure regulating gas to the pilot chamber; and
    a control circuit for sending switching signals to the absolute pressure sensor and the differential pressure sensor, and driving the control valve based on the output from the absolute pressure sensor or differential pressure sensor;
    wherein a portion of the pressure regulating gas supplied to the pilot chamber is made a purge gas for protecting the absolute pressure sensor and the differential pressure sensor; a purge gas flow path connects the pilot chamber, the absolute pressure sensor and differential pressure sensor, and the intake port.

2. An exhaust apparatus pressure control system comprising:
    a main body wherein an intake port and a discharge port are formed, the main body comprising a pilot chamber;
    a spool comprising an upper slide and a lower slide, the spool is attached by a spring to the upper part of the main body, and the spool is held by the upper slide and the lower slide so that it can slide in an axial direction over a sliding surface connecting the intake port and the discharge port; and an absolute pressure sensor for detecting the pressure in the intake port and a differential pressure sensor for detecting the difference between the pressure in the intake port and atmospheric pressure;

a control valve for supplying a pressure regulating gas to the pilot chamber; and a control circuit for sending switching signals to the absolute pressure sensor and the differential pressure sensor, and driving the control valve based on the output from the absolute pressure sensor or differential pressure sensor;

wherein the gas supply port for supplying gas to the interior of the main body, and the absolute pressure sensor and differential pressure sensor, are connected.

3. An exhaust apparatus pressure control system comprising:

a main body wherein an intake port and a discharge port are formed, the main body comprising a pilot chamber;

a spool comprising an upper slide and a lower slide, the spool is attached by a spring to the upper part of the main body, and the spool is held by the upper slide and the lower slide so that it can slide in an axial direction over a sliding surface connecting the intake port and the discharge port; and an absolute pressure sensor for detecting the pressure in the intake port and a differential pressure sensor for detecting the difference between the pressure in the intake port and atmospheric pressure;

a control valve for supplying a pressure regulating gas to the pilot chamber; and a control circuit for sending switching signals to the absolute pressure sensor and the differential pressure sensor, and driving the control valve based on the output from the absolute pressure sensor or differential pressure sensor;

wherein a channel is formed in the side surface of the spool, and gas for making the working of the spool smooth is supplied to the channel, wherein gas for regulating the degree of opening of the valve unit is supplied to the interior of the spool on the intake port side;

wherein a flow path is provided for supplying the gas for regulating the degree of opening of the valve unit to the channel and to the interior of the spool on the intake port side, and a portion of the gas flowing through the flow path is made a purge gas for protecting the absolute pressure sensor and differential pressure sensor; a purge gas flow path connects the flow path, the absolute pressure sensor and differential pressure sensor, and the intake port.

4. An exhaust apparatus pressure control system comprising:

a main body wherein an intake port and a discharge port are formed, the main body comprising a pilot chamber;

a spool comprising an upper slide and a lower slide, the spool is attached by a spring to the upper part of the main body, and the spool is held by the upper slide and the lower slide so that it can slide in an axial direction over a sliding surface connecting the intake port and the discharge port; and an absolute pressure sensor for detecting the pressure in the intake port and a differential pressure sensor for detecting the difference between the pressure in the intake port and atmospheric pressure;

a control valve for supplying a pressure regulating gas to the pilot chamber; and a control circuit for sending switching signals to the absolute pressure sensor and the differential pressure sensor, and driving the control valve based on the output from the absolute pressure sensor or differential pressure sensor;

wherein a channel is formed in the side surface of the spool, and gas for making the working of the spool smooth is supplied to the channel;

wherein a flow path is provided for supplying the gas for making the working of the spool smooth to the channel and to the interior of the spool on the intake port side, and a portion of the gas flowing through the flow path is made a purge gas for protecting the absolute pressure sensor and differential pressure sensor; a purge gas flow path connects the flow path, the absolute pressure sensor and differential pressure sensor, and the intake port.

* * * * *